US011208058B2

(12) United States Patent
Yamaguchi et al.

(10) Patent No.: US 11,208,058 B2
(45) Date of Patent: Dec. 28, 2021

(54) ELECTRICAL COMPONENT-ATTACHED WIRE HARNESS FOR VEHICLE DASHBOARD AND ASSEMBLY STRUCTURE OF ELECTRICAL COMPONENT-ATTACHED WIRE HARNESS

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP)

(72) Inventors: Koji Yamaguchi, Mie (JP); Housei Mizuno, Mie (JP); Shinya Sadohara, Mie (JP); Hiroki Hirai, Mie (JP); Shinya Itou, Mie (JP); Yutaka Matsumura, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/637,110

(22) PCT Filed: Jun. 26, 2018

(86) PCT No.: PCT/JP2018/024170
§ 371 (c)(1),
(2) Date: Feb. 6, 2020

(87) PCT Pub. No.: WO2019/039073
PCT Pub. Date: Feb. 28, 2019

(65) Prior Publication Data
US 2020/0180525 A1    Jun. 11, 2020

(30) Foreign Application Priority Data

Aug. 23, 2017   (JP) .............................. JP2017-160343

(51) Int. Cl.
*B60R 16/02* (2006.01)
*B62D 25/14* (2006.01)

(52) U.S. Cl.
CPC .......... *B60R 16/0207* (2013.01); *B62D 25/14* (2013.01)

(58) Field of Classification Search
CPC .......... B60R 16/02; B60R 2021/01286; B60R 2021/01006; B60R 16/0215;
(Continued)

(56) References Cited

U.S. PATENT DOCUMENTS 2,818,933 A  *  1/1958  Tell ........................ B60K 37/02
                                                        180/90
3,513,499 A  *  5/1970  Termaat ................. B60J 10/265
                                                        15/250.01
(Continued)

FOREIGN PATENT DOCUMENTS

CN          1243482      2/2000
CN          104015673    9/2014
(Continued)

OTHER PUBLICATIONS

International Search Report issued in International Patent Application No. PCT/JP2018/024170, dated Aug. 28, 2018.
(Continued)

*Primary Examiner* — Timothy J. Dole
*Assistant Examiner* — Muhammed Azam
(74) *Attorney, Agent, or Firm* — Greenblum & Bernstein, P.L.C.

(57) ABSTRACT

An electrical component-attached wire harness includes a base material disposed in a vehicle, a wire harness disposed along the base material, and at least one electrical component to which an end portion of the wire harness is con-
(Continued)

nected. For example, the at least one electrical component may include an electronic control unit.

10 Claims, 5 Drawing Sheets

(58) Field of Classification Search
CPC .... B60R 16/0239; B62D 25/14; B62D 25/20; H01B 7/00; H01B 7/40; H02G 3/30
See application file for complete search history.

(56) References Cited

U.S. PATENT DOCUMENTS

| | | | | |
|---|---|---|---|---|
| 3,548,441 A * | 12/1970 | Kruger | | B60S 1/583 15/250.01 |
| 3,590,136 A * | 6/1971 | Kunishi | | H05K 1/0284 174/50 |
| 3,774,713 A * | 11/1973 | Stegmaier | | B60R 21/045 180/90 |
| 4,025,896 A * | 5/1977 | Hintze | | B60K 35/00 362/253 |
| 4,105,223 A * | 8/1978 | Oda | | B60R 21/045 180/90 |
| 4,646,879 A * | 3/1987 | Mahler | | B60H 1/242 180/90 |
| 4,942,499 A * | 7/1990 | Shibata | | B60R 16/0239 174/72 A |
| 5,120,106 A * | 6/1992 | Sakurai | | B60T 7/06 296/193.02 |
| 5,255,155 A * | 10/1993 | Sugimoto | | B60R 16/0239 174/254 |
| 5,273,310 A * | 12/1993 | Terai | | B60R 21/205 180/90 |
| 5,324,203 A * | 6/1994 | Sano | | B60K 37/00 439/34 |
| 5,333,901 A * | 8/1994 | Barnes | | B60K 37/00 180/90 |
| 5,353,190 A * | 10/1994 | Nakayama | | B60K 37/00 361/647 |
| 5,354,114 A * | 10/1994 | Kelman | | B60H 1/0055 296/192 |
| 5,442,518 A * | 8/1995 | Beam | | B60H 1/00564 138/103 |
| 5,549,324 A * | 8/1996 | Labrie | | B60R 21/205 264/46.5 |
| 5,549,344 A * | 8/1996 | Nishijima | | B60H 1/0055 180/90 |
| 5,675,316 A * | 10/1997 | Nishitani | | B60K 37/00 340/461 |
| 5,676,552 A * | 10/1997 | Fukuda | | B60K 37/04 439/34 |
| 5,685,598 A * | 11/1997 | Inoue | | B60H 1/00535 180/90 |
| 5,706,170 A * | 1/1998 | Glovatsky | | B60H 1/0055 361/695 |
| 5,707,100 A * | 1/1998 | Suyama | | B60H 1/00514 180/90 |
| 5,709,358 A * | 1/1998 | Kubota | | B60K 37/00 248/27.1 |
| 5,712,764 A * | 1/1998 | Baker | | B60R 16/0239 180/90 |
| 5,715,140 A * | 2/1998 | Sinkunas | | B60R 16/0215 296/208 |
| 5,754,398 A * | 5/1998 | Glovatsky | | B29C 45/14344 264/249 |
| 5,771,575 A * | 6/1998 | Onizuka | | B60K 37/02 29/868 |
| 5,811,732 A * | 9/1998 | Beam | | H02G 3/00 174/72 A |
| 5,841,070 A * | 11/1998 | Takiguchi | | B60K 37/00 174/72 A |
| 5,856,908 A * | 1/1999 | Takiguchi | | B60R 16/0215 361/690 |
| 5,857,863 A * | 1/1999 | Onizuka | | B60R 16/0207 439/248 |
| 5,947,189 A * | 9/1999 | Takeuchi | | F04D 29/582 165/51 |
| 6,073,987 A * | 6/2000 | Lindberg | | B62D 25/142 180/90 |
| 6,092,854 A | 7/2000 | Campbell | | |
| 6,095,272 A * | 8/2000 | Takiguchi | | B60K 37/00 180/90 |
| 6,139,082 A * | 10/2000 | Davis, Jr. | | B62D 25/145 280/752 |
| 6,176,534 B1 * | 1/2001 | Duncan | | B60K 37/04 296/37.12 |
| 6,186,887 B1 * | 2/2001 | Dauvergne | | B60H 1/00028 296/208 |
| 6,203,092 B1 * | 3/2001 | Yoshinaka | | B62D 25/142 296/70 |
| 6,234,569 B1 * | 5/2001 | Derleth | | B60H 1/0055 296/208 |
| 6,250,706 B1 * | 6/2001 | Davis, Jr. | | B60K 37/00 296/70 |
| 6,257,897 B1 * | 7/2001 | Kubota | | B60H 1/00557 439/34 |
| 6,325,440 B1 * | 12/2001 | Emmerich | | B62D 25/145 180/90 |
| 6,351,962 B1 * | 3/2002 | Mizutani | | B60H 1/00528 180/90 |
| 6,364,394 B1 * | 4/2002 | Davis, Jr. | | B60K 37/00 296/70 |
| 6,378,934 B1 * | 4/2002 | Palazzolo | | B60H 1/0055 296/208 |
| 6,388,881 B2 * | 5/2002 | Yamauchi | | B60H 1/00985 361/704 |
| 6,439,652 B2 * | 8/2002 | Fujita | | B60K 37/00 296/192 |
| 6,441,510 B1 * | 8/2002 | Hein | | B60K 37/00 307/10.1 |
| 6,780,020 B2 * | 8/2004 | Kondo | | H01R 25/161 439/34 |
| 6,890,016 B2 * | 5/2005 | Brancheriau | | B60K 37/00 296/193.02 |
| 6,974,172 B2 * | 12/2005 | Gebreselassie | | B60R 13/083 180/90 |
| 7,291,785 B2 * | 11/2007 | Riester | | B60R 16/0215 174/72 A |
| 7,447,031 B2 * | 11/2008 | Appel | | B60K 37/00 361/700 |
| 7,494,174 B2 * | 2/2009 | Harata | | B60R 13/0815 296/70 |
| 7,712,579 B2 * | 5/2010 | Ueno | | B60N 3/048 181/286 |
| 9,096,274 B2 * | 8/2015 | Kaneko | | B62D 21/09 |
| 9,849,768 B2 * | 12/2017 | Hayashi | | B60L 50/40 |
| 10,422,270 B2 * | 9/2019 | Tanno | | B62D 25/082 |
| 10,611,235 B2 * | 4/2020 | Sakashita | | B60K 11/085 |
| 10,634,024 B2 * | 4/2020 | Bogard | | F01N 1/023 |
| 10,946,817 B2 * | 3/2021 | Nishimura | | B60R 16/0215 |
| 10,946,818 B2 * | 3/2021 | Takamatsu | | B60R 16/0238 |
| 10,960,831 B2 * | 3/2021 | Nishimura | | B60R 16/0215 |
| 11,034,313 B2 * | 6/2021 | Nishimura | | B60R 16/0215 |
| 2004/0164589 A1 * | 8/2004 | Glovatsky | | B60R 16/0207 296/192 |
| 2015/0321625 A1 | 11/2015 | Sato et al. | | |
| 2017/0030248 A1 * | 2/2017 | Knoll | | C03C 25/47 |
| 2017/0313266 A1 | 11/2017 | Mizuno et al. | | |
| 2019/0287696 A1 * | 9/2019 | Mizuno | | H01B 7/04 |
| 2019/0392963 A1 * | 12/2019 | Ishida | | H02G 3/30 |
| 2020/0043631 A1 * | 2/2020 | Mizuno | | H01B 13/01209 |
| 2020/0105016 A1 * | 4/2020 | Yamada | | G06K 9/0061 |
| 2020/0180525 A1 * | 6/2020 | Yamaguchi | | B60R 16/0207 |
| 2020/0180527 A1 * | 6/2020 | Nishimura | | B60R 16/0215 |
| 2020/0203037 A1 * | 6/2020 | Yamaguchi | | H01B 7/40 |
| 2020/0298914 A1 * | 9/2020 | Sakashita | | B60R 13/0876 |

(56) References Cited

U.S. PATENT DOCUMENTS

| | | | | |
|---|---|---|---|---|
| 2020/0406839 A1* | 12/2020 | Takakura | ................ | B60R 16/02 |
| 2021/0039569 A1* | 2/2021 | Hoshing | ............... | B60R 13/083 |
| 2021/0151969 A1* | 5/2021 | Nishimura | .............. | B60R 16/02 |

FOREIGN PATENT DOCUMENTS

| | | | | |
|---|---|---|---|---|
| CN | 104871383 | | 8/2015 | |
| GB | 2 203 598 A | | 10/1988 | |
| JP | 59006150 A | * | 1/1984 | ........... B60R 13/083 |
| JP | 61-245410 A | | 10/1986 | |
| JP | 61-271707 A | | 12/1986 | |
| JP | 63-176757 A | | 7/1988 | |
| JP | 64-63436 A | | 3/1989 | |
| JP | 64-67809 A | | 3/1989 | |
| JP | 2016-88408 A | | 5/2016 | |

OTHER PUBLICATIONS

International Preliminary Report on Patentability issued in International Patent Application No. PCT/JP2018/024170, dated Feb. 27, 2020.
Japan Official Action issued in JP Application No. 2017-160343, dated Dec. 8, 2020, and English language translation thereof.
Chinese Official Action received in Application No. 201880054333.9 dated Nov. 13, 2020, and English language translation thereof.

* cited by examiner

F I G. 5
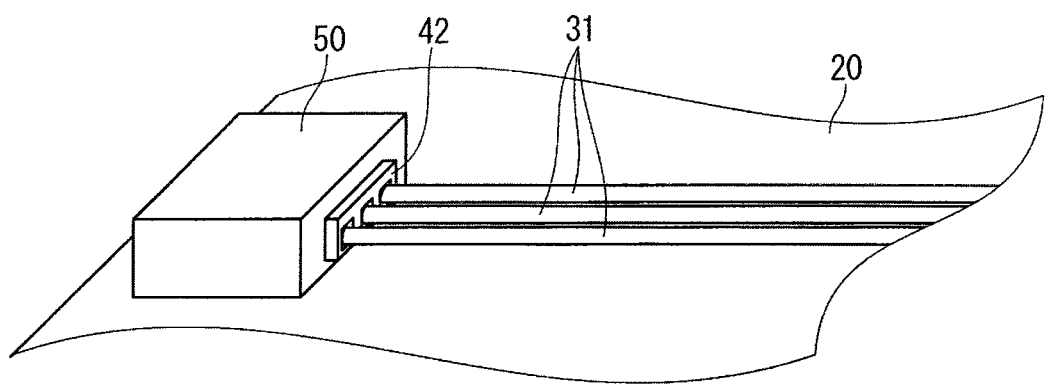

ELECTRICAL COMPONENT-ATTACHED WIRE HARNESS FOR VEHICLE DASHBOARD AND ASSEMBLY STRUCTURE OF ELECTRICAL COMPONENT-ATTACHED WIRE HARNESS

TECHNICAL FIELD

The present invention relates to a technique of assembling an electrical component and a wire harness connected to the electrical component in a vehicle.

BACKGROUND ART

Patent Document 1 discloses a technique of assembling a wire harness to a reinforcement disposed on a back side of an installment panel.

PRIOR ART DOCUMENTS

Patent Documents

Patent Document 1: Japanese Patent Application Laid-Open No. 2016-88408

SUMMARY

Problem to be Solved by the Invention

It is considered herein that an end portion of the wire harness assembled to the reinforcement is connected to an electrical component such as an ECU separately assembled to a vehicle at a time of assembling the vehicle.

However, when the end portion of the wire harness is connected to the electrical component at the time of assembling the vehicle as described above, there is a possibility that the number of working processes in assembling the vehicle increases. Moreover, there is that a possibility a working in a narrow space is necessary depending on an assembling area.

Thus, an object of the present invention is to provide a technique capable of easily assembling an electrical component, which is previously connected to an end portion of a wire harness, to a vehicle.

Means to Solve the Problem

In order to solve the above problem, an electrical component-attached wire harness according to a first aspect is an electrical component-attached wire harness which can be assembled to a vehicle, and includes: a base material disposed in a vehicle; a wire harness disposed along the base material and fixed on the base material; and at least one electrical component to which an end portion of the wire harness is connected.

The electrical component-attached wire harness according to a second aspect is the electrical component-attached wire harness according to the first aspect, wherein the at least one electrical component includes an electronic control unit.

The electrical component-attached wire harness according to a third aspect is the electrical component-attached wire harness according to the first or second aspect, wherein the wire harness is flatly formed.

The electrical component-attached wire harness according to a fourth aspect is the electrical component-attached wire harness according to the third aspect, wherein an electrical wire in the wire harness is directly fixed on the base material.

The electrical component-attached wire harness according to a fifth aspect is the electrical component-attached wire harness according to any one of the first to fourth aspects, wherein the base material is a silencer covering at least one of a dashboard panel and a floor panel in a vehicle body.

The electrical component-attached wire harness according to a sixth aspect is the electrical component-attached wire harness according to the fifth aspect, wherein the silencer includes a dashboard silencer region part covering the dashboard panel, and the at least one electrical component includes a dashboard panel-side electrical component connected to an end portion of a part of the wire harness disposed in the dashboard silencer region part and disposed on the dashboard panel.

The electrical component-attached wire harness according to a seventh aspect is the electrical component-attached wire harness according to the sixth aspect, wherein the dashboard panel-side electrical component includes a first dashboard panel-side electrical component fixed to the dashboard silencer region part.

The electrical component-attached wire harness according to an eighth aspect is the electrical component-attached wire harness according to the sixth or seventh aspect, wherein the dashboard panel-side electrical component includes a second dashboard panel-side electrical component which is not fixed to the dashboard silencer region part.

An assembly structure of an electrical component-attached wire harness according to a ninth aspect includes: the electrical component-attached wire harness; and a dashboard panel to which the electrical component-attached wire harness is assembled, wherein the electrical component-attached wire harness includes a base material disposed in a vehicle, a wire harness disposed along the base material, and at least one electrical component to which an end portion of the wire harness is connected, the base material is a silencer including a dashboard silencer region part covering at least the dashboard panel of the dashboard panel and a floor panel in a vehicle body, the at least one electrical component includes a dashboard panel-side electrical component connected to an end portion of a part of the wire harness disposed in the dashboard silencer region part and disposed on the dashboard panel, and the dashboard panel is formed to be able to open and close so as to open to an outer side of a vehicle interior.

An assembly structure of an electrical component-attached wire harness according to a tenth aspect includes: the electrical component-attached wire harness according to any one of the first to eighth aspects; and an assembly object to which the electrical component-attached wire harness is assembled, wherein the electrical component is assembled in a state where a maintenance can be performed on the electrical component.

Effects of the Invention

According to each aspect, the base material in the electrical component-attached wire harness is disposed in the vehicle, thus the electrical component connected to the end portion of the wire harness can be easily disposed in a position where the electrical component is disposed or near the position. Accordingly, the electrical component which is previously connected to the end portion of the wire harness can be easily assembled to the vehicle.

Particularly, according to the second aspect, the electronic control unit connected to the end portion of the wire harness can be easily assembled to the vehicle.

Particularly, according to the third aspect, an increase in a height of the electrical component-attached wire harness can be suppressed. Accordingly, an area where the electrical component-attached wire harness can be disposed in the vehicle increases.

Particularly, according to the fourth aspect, an increase in a height of the electrical component-attached wire harness can be suppressed.

Particularly, according to the fifth aspect, the electrical component can be assembled together with the silencer.

Particularly, according to the sixth aspect, some of the electrical components can be easily disposed on the dashboard panel together with the base material.

Accordingly, a space near the dashboard panel which has tended to be a dead space can be effectively used.

Particularly, according to the seventh aspect, the first dashboard panel-side electrical component can be easily located near the fixation position at the time of assembling the base material to the vehicle.

Particularly, according to the eighth aspect, the second dashboard panel-side electrical component can be easily located near the fixation position at the time of assembling the base material to the vehicle.

Particularly, according to the ninth aspect, the maintenance can be performed on the electrical component from the outer side of the vehicle interior.

Particularly, according to the tenth aspect, the maintenance can be performed on the electrical component.

BRIEF DESCRIPTION OF DRAWINGS

FIG. 5 An explanation diagram illustrating another example of the method of fixing the electrical wire and the base material.

DESCRIPTION OF EMBODIMENT(S)

Embodiment

An electrical component-attached wire harness according to an embodiment and an assembly structure thereof are described hereinafter.

Figure 1:
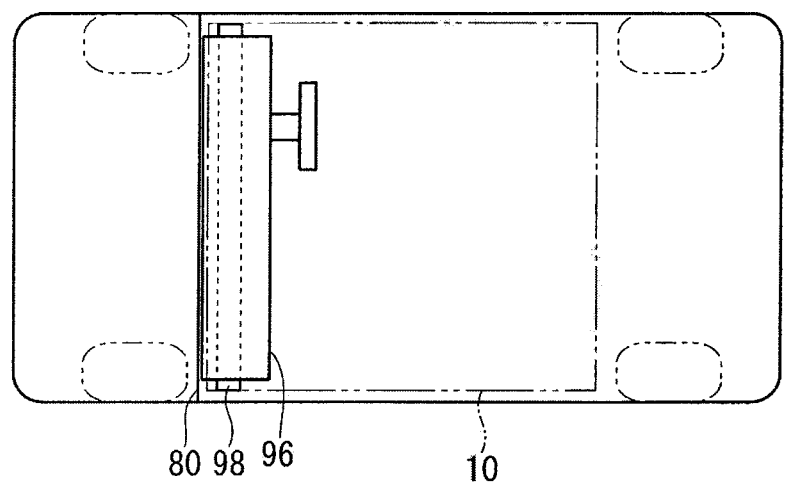
FIG. 1 An explanation diagram illustrating a positional relationship of an electrical component-attached wire harness according to an embodiment assembled to a vehicle.
Figure 2:
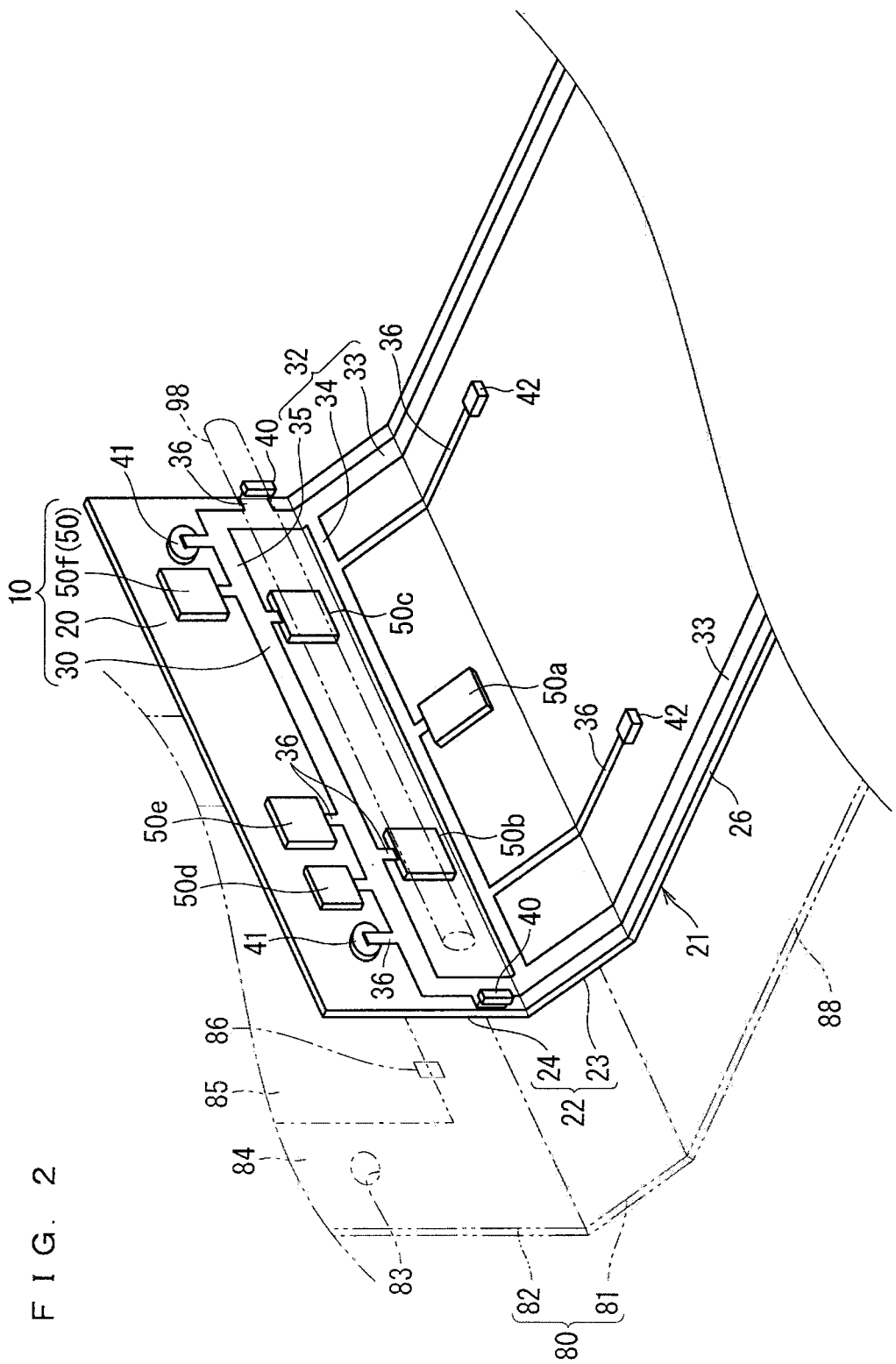
FIG. 2 A schematic perspective view illustrating the electrical component-attached wire harness according to the embodiment.
Figure 3:
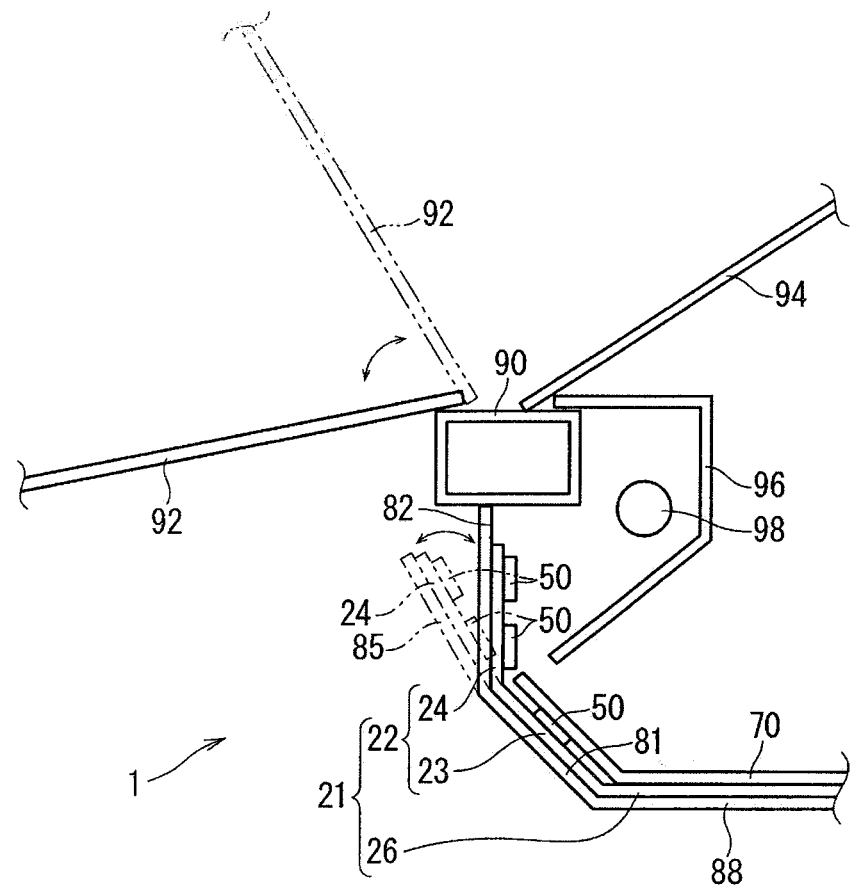
FIG. 3 An explanation diagram illustrating an assembly structure of the electrical component-attached wire harness according to the embodiment.

FIG. 1 is an explanation diagram illustrating a positional relationship of an electrical component-attached wire harness 10 according to the embodiment assembled to a vehicle. FIG. 2 is a schematic perspective view illustrating the electrical component-attached wire harness 10 according to the embodiment. FIG. 3 is an explanation diagram illustrating an assembly structure 1 of the electrical component-attached wire harness according to the embodiment.

The assembly structure 1 of the electrical component-attached wire harness includes the electrical component-attached wire harness 10 and an assembly object to which the electrical component-attached wire harness 10 is assembled. The present example describes an example that the assembly object includes a dashboard panel 80.

More specifically, the electrical component-attached wire harness 10 includes a base material 20, a wire harness 30 disposed on the base material 20, and an electrical component 50 to which an end portion of the wire harness 30 is connected. The electrical component-attached wire harness 10 is configured to be able to be assembled to a vehicle in the state where the end portion of the wire harness 30 is connected to the electrical component 50.

The base material 20 is disposed in the vehicle. In the description of the present example, the base material 20 is a silencer 21 covering at least one of the dashboard panel 80 and a floor panel 88 in a vehicle body. Particularly in the description of the present example, the silencer 21 includes both a dashboard silencer region part 22 covering the dashboard panel 80 and a floor silencer region part 26 covering the floor panel 88.

Accordingly, the assembly object of the electrical component-attached wire harness 10 in the present example includes the dashboard panel 80 and the floor panel 88 in the vehicle body. Herein, the floor panel 88 is a part constituting a floor part in the vehicle body. The dashboard panel 80 is a part standing on the floor panel 88 to define a front side of a vehicle interior in the vehicle body and constitute a partition wall part partitioning an inner side and outer side of the vehicle interior. That is to say, the vehicle body in back of the dashboard panel 80 constitutes the inner side of the vehicle interior, and the vehicle body in front of the dashboard panel 80 constitutes the outer side of the vehicle interior. In a general passenger automobile, the vehicle body in front of the dashboard panel 80 constitutes an engine room, thus in the description hereinafter, the vehicle body in front of the dashboard panel 80 constitutes the engine room.

Herein, the dashboard panel 80 includes a lower part 81 continuing into the floor panel 88 and gently standing thereon and an upper part 82 continuing into the lower part 81 and inclined more than the lower part 81 (extending in a perpendicular direction herein). In the example illustrated in FIG. 3, an upper side portion of the upper part 82 continues into a cowl 90. The cowl 90 is a part located between a hood 92 (also referred to as a bonnet and a lid, for example) and a front windshield 94. An installment panel 96 and a reinforcement 98 are disposed on the inner side of the vehicle interior on the upper part 82 of the dashboard panel 80.

Formed in the dashboard panel 80 is a through hole 83 through which the wire harness 30 extending between the engine room and the inner side of the vehicle interior passes. Furthermore, the dashboard panel 80 is formed to be able to open and close herein. More specifically, the dashboard panel 80 is formed to be able to open and close so as to open to the outer side of the vehicle interior. In the example illustrated in FIG. 2, part of the dashboard panel 80 is separated from a body part 84 of the upper part 82 to constitute an open-close part 85, and the open-close part 85 is connected to the body part 84 via a hinge 86.

As described above, the silencer 21 includes the dashboard silencer region part 22 covering the dashboard panel 80 and the floor silencer region part 26 covering the floor panel 88. At this time, in the description, the dashboard silencer region part 22 and the floor silencer region part 26 are integrally molded in the silencer 21. It is considered that a member made up of a non-woven cloth or a fiber compressed and fixed by an adhesive agent or a foam resin or a chip of foam resin compressed and fixed, for example, is used as the silencer 21. Herein, the dashboard silencer region part 22 has a first part 23 gently stand on the floor silencer region part 26 and a second part 24 extending from the first part 23 in a vertical direction. The first part 23 is a part covering the lower part 81, and the second part 24 is a part covering the upper part 82.

In the example illustrated in FIG. 2, the first part 23 and the second part 24 in the dashboard silencer region part 22 and the floor silencer region part 26 are formed into a flat sheet-like shape, however, also considered is a case where these parts include an uneven shape corresponding to an uneven shape of the vehicle body. Also considered is a case where a hole part for a member such as a gas pedal, a brake pedal, a clutch pedal, and a shift lever (a select lever), for example, is formed in the silencer 21. In the example illustrated in FIG. 3, a floor mat 70 is provided on the inner side of vehicle interior on the silencer 21. The floor mat 70 is a part exposed to the inner side of the vehicle interior. There may also be a case where the floor mat 70 is integrated with the silencer 21.

The wire harness 30 is disposed along the silencer 21 which is the base material 20. In the example illustrated in FIG. 2, the wire harness 30 is disposed on the inner side of the vehicle interior on the base material 20, however, this configuration is not necessary. There may also be a case where the wire harness 30 is disposed on the outer side of the vehicle interior on the base material 20. In the example illustrated in FIG. 2, the wire harness 30 includes a main line 32 made up of a relatively large number of electrical wires and a branch line 36 branching from the main line 32.

The main line 32 has a front-back direction extension part 33 extending in a front-back direction of the vehicle from the dashboard silencer region part the dashboard silencer region part 22 to the floor silencer region part 26, a first right-left direction extension part 34 extending in a right-left direction of the vehicle in the first part 23 in the dashboard silencer region part 22, and a second right-left direction extension part 35 extending in the right-left direction of the vehicle in the second part 24 in the same dashboard silencer region part 22.

The front-back direction extension part 33 is provided on both end sides of the vehicle in the right-left direction. A first relay connector 40 is provided on the front-back direction extension part 33. The first relay connector 40 is connected to a relay connector provided on a wire harness for an apparatus grounded on the installment panel 96 which is provided separately from the wire harness 30, for example. The wire harness for the installment panel 96 is a wire harness disposed along the reinforcement 98, for example. Herein, the first relay connector 40 is provided on an end portion of the branch line 36 extending from a portion located between the first right-left direction extension part 34 and the second right-left direction extension part 35 in the front-back direction extension part 33. The end portion of the branch line 36 extends in a normal line direction relative to the first part 23. It is considered that the front-back direction extension part 33 is connected to a door harness and a rear harness via a relay connector, for example, in a position nearer a rear side than a position illustrated in FIG. 2.

The plurality of (three herein) branch lines 36 extend from the first right-left direction extension part 34, and a connector 42 connected to an electrical component separately assembled to the vehicle body is provided on the end portion of the two branch lines 36. The electrical component 50 is connected to the end portion of one branch line 36.

The plurality of branch lines 36 extend from the second right-left direction extension part 35, and herein, the plurality of (five herein) electrical components 50 are connected to the branch lines 36, respectively. A second relay connector 41 is provided on the second right-left direction extension part 35. The second relay connector 41 is connected to a relay connector provided on the other wire harness disposed on a side of the engine room, for example. For example, the electrical wire extending from the relay connector is inserted into the through hole 83 in the dashboard panel 80. The second relay connector 41 is provided to pass through the first part 23 in the dashboard silencer region part 22.

FIG. 2 illustrates an example of a configuration of arranging the wire harness 30, thus the configuration of arranging the wire harness 30 is not limited thereto. The wire harness 30 includes a plurality of electrical wires 31 (refer to FIG. 4), however, in the example illustrated in FIG. 2, the illustration of the plurality of electrical wires 31 is omitted.

Figure 4:
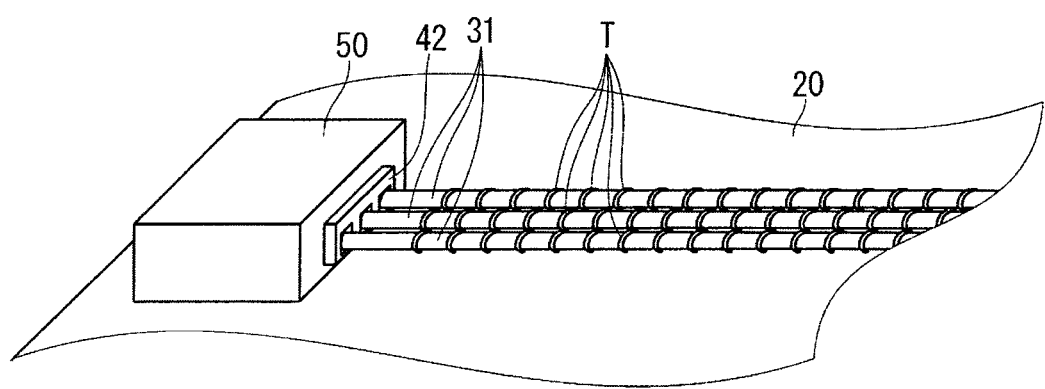
FIG. 4 An explanation diagram illustrating an example of a method of fixing an electrical wire and a base material.

Herein, the wire harness 30 is flatly formed. For example, as illustrated in FIG. 4, the electrical wire 31 in the wire harness 30 is disposed in parallel with the base material 20, thus the wire harness 30 is flatly formed.

Herein, the electrical wire 31 in the wire harness 30 is directly fixed to the base material 20. A means of fixing the electrical wire 31 is not particularly limited, but the electrical wire 31 is considered to be sewn to the base material 20 by a thread T as illustrated in FIG. 4, for example. A sewing method is not particularly limited, but a lockstitch or a chain stitch using a sewing machine and hand-stitch are also applicable. For example, as illustrated in FIG. 5, also considered is that an insulating covering of the electrical wire 31 in the wire harness 30 and the base material 20 are ultrasonic-welded. Also considered is that the electrical wire 31 in the wire harness 30 is directly fixed to the base material 20 by an inclusion having adhesiveness or stickiness such as an adhesive agent or a double-sided adhesive tape.

At least one electrical component 50 is provided. The end portion of the wire harness 30 is connected to the electrical component 50. For example, as illustrated in FIG. 4, the electrical component 50 is connected to the wire harness 30 via the connector 42 for connection provided on the end portion of the wire harness 30. The end portion of the electrical wire 31 may be directly connected without the intervention by the connector 42. Herein, the electrical component 50 in the present specification is not a mere relay component such as the connector 42, but indicates a component having a function other than a power conduction. The electrical component 50 herein includes an electronic control unit (referred to as ECU hereinafter). In the description hereinafter, all the electrical components 50 illustrated in FIG. 2 are the ECU, however, the electrical component 50 other than the ECU is also applicable. Considered as the ECU is a body ECU controlling an electrical component in the vehicle body, an ABS-ECU performing control regarding an antilock brake system (ABS), or an air-bag ECU controlling an air-bag in the vehicle, for example. Considered as the electrical component 50 other than the ECU are a component regarding a power supply and a component regarding a signal transmission, more specifically, a relay and a fuse, for example.

Herein, the electrical component 50 includes a dashboard panel-side electrical component. The dashboard panel-side electrical component is connected to an end portion of a part of the wire harness 30 disposed in the dashboard silencer region part 22. The dashboard panel-side electrical component is disposed on the dashboard panel 80.

Specifically, the dashboard panel-side electrical component includes a first dashboard panel-side electrical component fixed to the dashboard silencer region part 22. All the electrical components 50 illustrated in FIG. 2 are the dashboard panel-side electrical component and are the first dashboard panel-side electrical component. There may also be a case where the dashboard panel-side electrical component includes a second dashboard panel-side electrical component which is not fixed to the dashboard silencer region part 22. This example is described in detail hereinafter.

An electrical component 50a fixed to the first part 23 in the dashboard silencer region part 22 is provided substantially in a center of the first right-left direction extension part 34 in a longitudinal direction, and is disposed between a driver seat and a passenger seat in the vehicle body. Accordingly, even when the electrical component 50a is fixed to the first par 23, a stepping on the electrical component 50a can be suppressed.

Electrical components 50b, 50c, 50d, 50e, and 50f fixed to the second part 24 in the dashboard silencer region part 22 are provided at intervals along the longitudinal direction of the second right-left direction extension part 35. The electrical components 50b and 50c are provided on a lower side of the second right-left direction extension part 35, and the electrical components 50d, 50e, and 50f are provided on an upper side of the second right-left direction extension part 35.

Herein, each electrical component 50 has a flat outer shape and is disposed to face a flat surface thereof toward the base material 20. Accordingly, a protrusion dimension from the base material 20 can be reduced. Particularly, the electrical component 50 disposed on the dashboard panel 80 is flat, thus a space for arranging the electrical component 50 in the front-back direction of the vehicle can be reduced.

The electrical component 50 is assembled in a state where a maintenance can be performed on the electrical component 50. Herein, the open-close part 85 is provided on the dashboard panel 80 as described above. Thus, when the hood 92 and the open-close part 85 are opened as illustrated in FIG. 2, the maintenance can be performed on the electrical component 50 from the outer side of the vehicle interior. At this time, a region of the open-close part 85 may be appropriately set, and it is considered that a portion where the electrical components 50b, 50c, 50d, 50e, and 50f are fixed or a portion where the electrical components 50d, 50e, and 50f are fixed is defined as the open-close part 85. Also considered is that an upper side portion of the portion where the electrical components 50b, 50c, 50d, 50e, and 50f are fixed is defined as the open-close part 85. An opening and closing amount in the open-close part 85 is not particularly limited as long as the maintenance can be performed on the electrical component 50 from the outer side of the vehicle interior. At this time, the electrical components 50b, 50d, and 50e are provided nearer a left side on the second right-left direction extension part 35, and the electrical components 50c and 50f are provided nearer a right side on the second right-left direction extension part 35. Accordingly, when the maintenance is performed on the electrical components 50b, 50c, 50d, 50e, and 50f from the outer side of the vehicle interior, a worker can easily reach the electrical components 50b, 50c, 50d, 50e, and 50f, thus the maintenance operation can be easily performed. In the example illustrated in FIG. 2, when the open-close part 85 is opened, the base material 20 and some of the electrical components 50 are rotated together with the open-close part 85, however, they need not be rotated.

According to the above embodiment, when the base material 20 in the electrical component-attached wire harness 10 is disposed in the vehicle, the wire harness 30 is disposed on the base material 20, thus the electrical component 50 connected to the end portion of the wire harness 30 can be easily disposed in a position where the electrical component 50 is disposed in the vehicle or near the position. Accordingly, the electrical component 50 which is previously connected to the end portion of the wire harness 30 can be easily assembled to the vehicle.

The electrical component 50 includes the ECU, thus the ECU connected to the end portion of the wire harness 30 can be easily assembled to the vehicle.

The electrical wire 31 in the wire harness 30 is flatly disposed, thus the increase in the height of the electrical component-attached wire harness 10 can be suppressed. Accordingly, an area where the electrical component-attached wire harness 10 can be disposed in the vehicle increases. At this time, the electrical wire 31 is directly fixed to the base material 20, thus the increase in the height of the electrical component-attached wire harness 10 can be suppressed more effectively.

The base material 20 is the silencer 21, thus the electrical component 50 can be assembled together with the silencer 21. At this time, the electrical component 50 includes the dashboard panel-side electrical component, thus some of the electrical components 50 can be easily disposed on the dashboard panel 80 together with the base material 20. Accordingly, a space near the dashboard panel 80 which has tended to be a dead space can be effectively used. Furthermore, the dashboard panel-side electrical component includes the first dashboard panel-side electrical component fixed to the base material 20, thus the first dashboard panel-side electrical component can be easily located near the fixation position at the time of assembling the base material 20 to the vehicle.

The dashboard panel 80 is formed to be able to open and close so as to open to the outer side of the vehicle interior, thus the maintenance can be performed on the electrical component 50 from the outer side of the vehicle interior.

Modification Example

Figure 6:
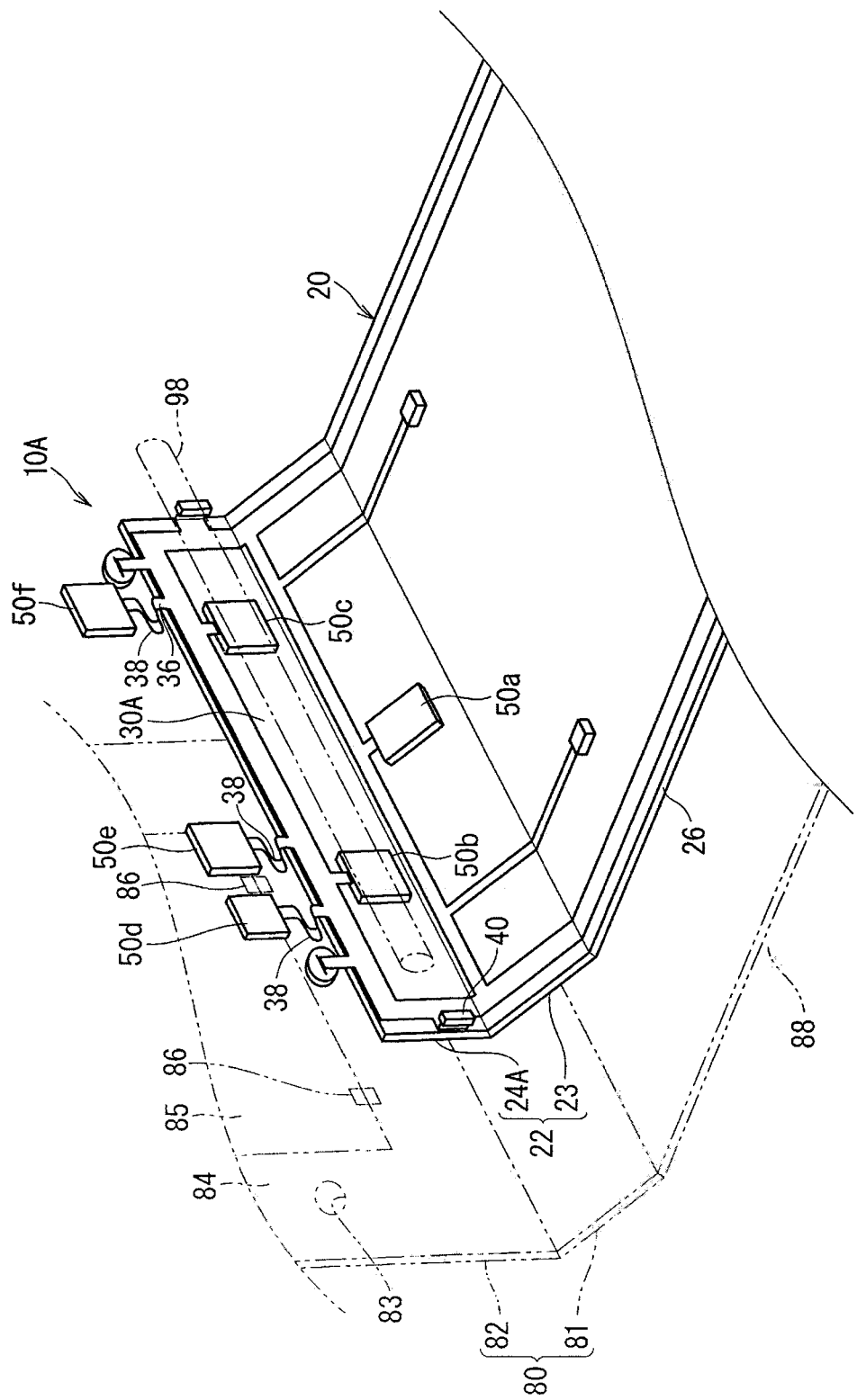
FIG. 6 A schematic perspective view illustrating the electrical component-attached wire harness according to a modification example.

FIG. 6 is a schematic perspective view illustrating an electrical component-attached wire harness 10A according to a modification example.

In the electrical component-attached wire harness 10A according to the modification example, the dashboard panel-side electrical component includes the second dashboard panel-side electrical component which is not fixed to a dashboard silencer region part 22. In the example illustrated in FIG. 6, each of the electrical components 50d, 50e, and 50f are defined as the second dashboard panel-side electrical component. At this time, a second part 24A in the dashboard silencer region part 22 in the silencer 21 is formed shorter than the second part 24 according to the embodiment. According to this configuration, a fixation of the second relay connector 41 to the second part 24A is resolved.

In this case, the electrical components 50d, 50e, and 50f are considered to be directly fixed to the dashboard panel 80. Particularly in this case, the electrical components 50d, 50e, and 50f are considered to be directly fixed to the open-close part 85 in the dashboard panel 80. At this time, an extra length part 38 is formed on the branch line 36 in the wire harness 30A connected to the electrical components 50d, 50e, and 50f. The extra length part 38 is a part whose length is set sufficiently longer than a minimum dimension of the open-close part 85 in a closed state when the electrical wire 31 is connected to the electrical components 50d, 50e, and 50f. When the extra length part 38 is formed, the electrical components 50d, 50e, and 50f can be rotated together with the open-close part 85 when the open-close part 85 is opened, thus the maintenance can be performed thereon.

Also in the present example, each of the electrical components 50a, 50b, and 50c is the first the dashboard panel-side electrical component fixed to the dashboard silencer region part 22. However, there may also be a case where the first dashboard panel-side electrical component is not included.

According to the present embodiment, the second dashboard panel-side electrical component can be easily located near the fixation position at the time of assembling the base material 20 to the vehicle. Also according to the present embodiment, the maintenance can be performed on the electrical component 50.

In the description according to the embodiment, the wire harness 30 is flatly formed, however, this configuration is not necessary. For example, the wire harness 30 may be bundled to have a circular shape in cross section.

In the description in the embodiment, the electrical wire 31 in the wire harness 30 is directly fixed to the base material 20, however, this configuration is not necessary. It is also applicable that, for example, the electrical wire 31 is fixed to a sheet material, and the sheet material is fixed to the base material 20.

In the description in the embodiment, the base material 20 is the silencer 21, however, this configuration is not necessary. Also considered is that the base material 20 is a trim, for example. Even when the base material 20 is the silencer 21, the configuration that the silencer 21 includes both the dashboard silencer region part 22 and the floor silencer region part 26 is not necessary, but there may also be a case where the silencer 21 includes only one of them. Even when the silencer 21 includes both the dashboard silencer region part 22 and the floor silencer region part 26, the configuration of integrally molding them is not necessary, but there may also be a case where they are separately made up.

In the description in the embodiment, the dashboard panel 80 is opened and closed, however, this configuration is not necessary. There may also be a case where the dashboard panel 80 is not opened and closed. In this case, the electrical component needs to be accessed from the inner side of the vehicle interior so that the maintenance can be performed thereon.

Each configuration described in the embodiment and each modification example can be appropriately combined as long as they are not contradictory.

Although the present invention is described in detail, the foregoing description is in all aspects illustrative and does not restrict the invention. It is therefore understood that numerous modifications and variations can be devised without departing from the scope of the invention.

EXPLANATION OF REFERENCE SIGNS 1 assembly structure of electrical component-attached wire harness
10 electrical component-attached wire harness
20 base material
21 silencer
22 dashboard silencer region part
26 floor silencer region part
30 wire harness
31 electrical wire
38 extra length part
50 electrical component
80 dashboard panel
85 open-close part
88 floor panel

The invention claimed is:

1. An electrical component-attached wire harness capable of being assembled to a vehicle, comprising:
   a base material configured to be disposed in the vehicle;
   a wire harness disposed along the base material and fixed on the base material; and
   at least one electrical component to which an end portion of the wire harness is connected,
   the base material is a silencer configured to cover at least one of a dashboard panel and/or a floor panel in the vehicle body, and
   the silencer includes a dashboard silencer region part having a front side surface and a rear side surface, the rear side surface covering the dashboard panel, and
   the at least one electrical component includes a dashboard panel-side electrical component that is provided on the front side surface of the silencer region part and is connected to an end portion of a part of the wire harness that is disposed in the dashboard silencer region part and on the dashboard panel.

2. The electrical component-attached wire harness according to claim 1, wherein
   the at least one electrical component includes an electronic control unit.

3. The electrical component-attached wire harness according to claim 1, wherein
   the wire harness is flatly formed.

4. The electrical component-attached wire harness according to claim 3, wherein
   an electrical wire in the wire harness is directly fixed on the base material.

5. The electrical component-attached wire harness according to claim 1, wherein
   the dashboard panel-side electrical component includes a first dashboard panel-side electrical component fixed to the dashboard silencer region part.

6. The electrical component-attached wire harness according to claim 1, wherein
   the dashboard panel-side electrical component includes a second dashboard panel-side electrical component which is not fixed to the dashboard silencer region part.

7. An assembly structure of an electrical component-attached wire harness, comprising:
   the electrical component-attached wire harness according to claim 1; and
   an assembly object to which the electrical component-attached wire harness is assembled, wherein
   the at least one electrical component is assembled in a state where a maintenance can be performed on the electrical component.

8. The electrical component-attached wire harness according to claim 1, wherein
   a connected part between the dashboard panel-side electrical component and the end portion of the wire harness disposed in the dashboard silencer region part is provided on the front side surface of the dashboard silencer region part.

9. An assembly structure of an electrical component-attached wire harness, comprising:
   the electrical component-attached wire harness; and a dashboard panel to which the electrical component-attached wire harness is assembled, wherein the electrical component-attached wire harness includes a base material disposed in a vehicle, a wire harness disposed along the base material, and at least one electrical component to which an end portion of the wire harness is connected, the base material is a silencer including a dashboard silencer region part covering at least the dashboard panel and/or a floor panel in a vehicle body, the at least one electrical component includes a dashboard panel-side electrical component connected to an end portion of a part of the wire harness disposed in the dashboard silencer region part and disposed on the dashboard panel, and the dashboard panel is formed to be able to open and close so as to open to an outer side of a vehicle interior.

10. An electrical component-attached wire harness capable of being assembled to a vehicle, comprising:

a base material configured to be disposed in the vehicle;

a wire harness disposed along the base material and fixed on the base material; and at least one electrical component to which an end portion of the wire harness is connected, wherein the base material is a silencer covering at least one of a dashboard panel and a floor panel in a vehicle body, the silencer includes a dashboard silencer region part covering the dashboard panel, the at least one electrical component includes a dashboard panel-side electrical component connected to an end portion of a part of the wire harness disposed in the dashboard silencer region part and disposed on the dashboard panel, the dashboard silencer region part includes a front side surface and a rear side surface, the rear side surface covering the dashboard panel, and the wire harness is disposed on the front side surface or the rear side surface.

* * * * *